P. E. PETERSON.
MARKING GAGE.
APPLICATION FILED MAY 1, 1917.

1,276,261.

Patented Aug. 20, 1918.
2 SHEETS—SHEET 1.

WITNESSES
Arthur K. Moore
S. M. McColl

INVENTOR
Philip E. Peterson
BY Richard B. Owen,
ATTORNEY

P. E. PETERSON.
MARKING GAGE.
APPLICATION FILED MAY 1, 1917.
1,276,261.
Patented Aug. 20, 1918.
2 SHEETS—SHEET 2.
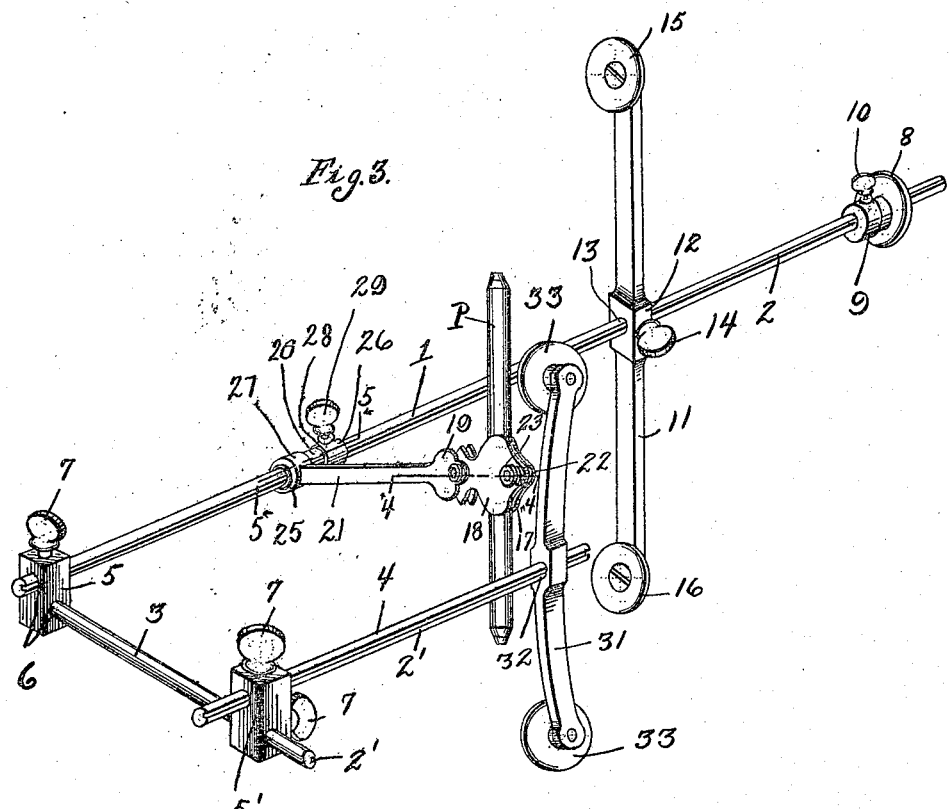
Fig. 3.
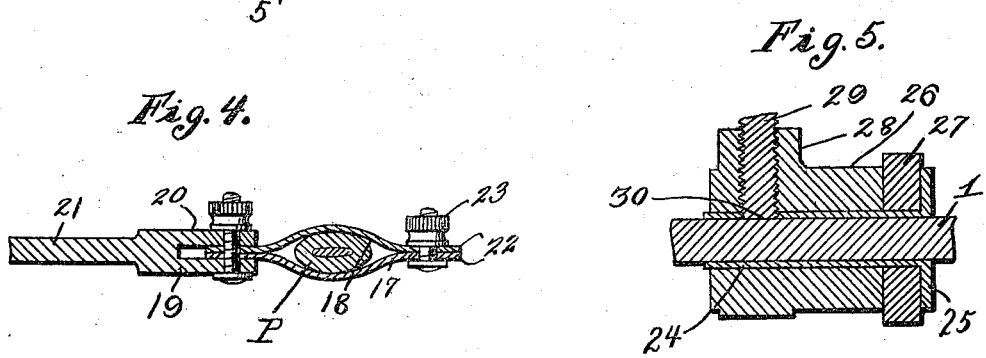
Fig. 4.
Fig. 5.
WITNESSES
Arthur K. Moore
S. M. McColl
INVENTOR
Philip E. Peterson
BY Richard Bowen,
ATTORNEY

UNITED STATES PATENT OFFICE.

PHILIP E. PETERSON, OF WHITEHALL, MICHIGAN.

MARKING-GAGE.

1,276,261.  Specification of Letters Patent.  Patented Aug. 20, 1918.

Application filed May 1, 1917. Serial No. 165,706.

*To all whom it may concern:*

Be it known that I, PHILIP E. PETERSON, a citizen of the United States, residing at Whitehall, in the county of Muskegon and State of Michigan, have invented certain new and useful Improvements in Marking-Gages, of which the following is a specification.

This invention relates to gages, and more particularly to marking gages.

The object of the invention is to so construct a gage of this character that the parts thereof may be varied in their relation to each other, to adapt it to be used for marking shingles to be trimmed after their application to a roof; for determining and marking each course of shingles with respect to the preceding course; for measuring and marking boards and for various other purposes.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Figure 1:
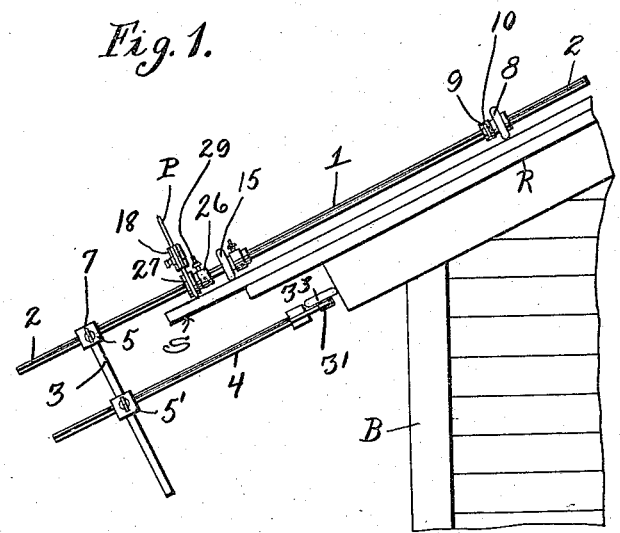
Figure 2:
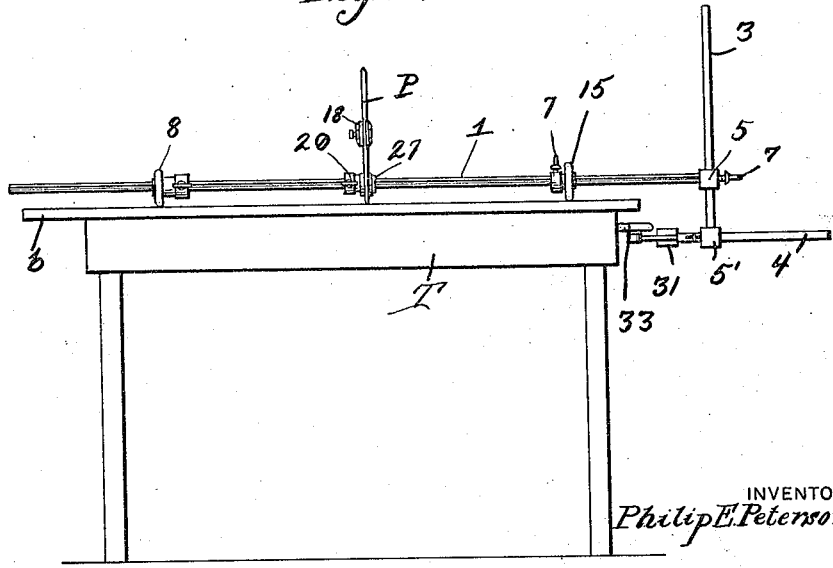

In the accompanying drawings:

Figure 1 represents a side elevation of a portion of a building showing this improved gage applied for marking shingles to be trimmed after their application to the building roof, Fig. 2 is a similar view showing the instrument in use for marking boards or other objects placed on a flat surface, Fig. 3 is an enlarged perspective view of the gage detached, Fig. 4 is an enlarged detail sectional view taken on the line 4—4 of Fig. 3, and Fig. 5 is a similar view taken on the line 5—5 of Fig. 3.

In the embodiment illustrated, the gage constituting this invention comprises a main cylindrical rod 1, which may be of any suitable or desired length and which has a groove 2 extending longitudinally through the length thereof for the reception of the points of thumb screws which are employed for securing the various coöperating parts of the implement in position on said rod.

Two other rods 3 and 4 are designed to be employed in connection with rod 1 and to be connected therewith by coupling blocks 5 and 5'. These blocks 5 and 5' have bores 6 extending in planes at right angles therethrough to provide for the passage of the rods 1, 3 or 4, or any two of them, according to the use to which the gage is to be put. Set screws 7 extend through threaded apertures in these blocks and are designed to engage the rods which pass through the bores of the blocks for locking the blocks and rods in position relative to each other.

The rods 3 and 4, it is to be understood, are grooved similar to rod 1 as is shown clearly at 2' in Fig. 3. A combined guide roller and spacer 8 is adjustably mounted on rod 1, being here shown in the form of a disk having a rounded peripheral edge with a sleeve 9 extending from one face thereof, the bore of said sleeve registering with the opening in said disk through which the rod 1 is designed to pass and which is adapted to be locked on said rod by means of a set screw 10 which extends through sleeve 9 as is seen clearly in Fig. 3. Slidably mounted on rod 1 is a combined guide arm and spacer 11 having an enlargement 12 midway its ends with an aperture 13 extending therethrough and through which rod 1 is designed to pass. This bar projects on opposite sides of rod 1 and has a set screw 14 for connecting it in adjusted position on said rod. Rollers 15 and 16 are carried by the ends of said bar 11 and are positioned on opposite sides of rod 1 being designed to engage the surface to be marked as is shown clearly in Figs. 1 and 2, said rollers engaging the shingles in Fig. 1 which are to be trimmed and the table top or board to be marked in Fig. 2.

The marking implement employed in connection with this instrument is preferably in the form of a double pointed pencil P which is clamped between two jaws 17 and 18 which are formed by folding a plate intermediately of its ends and disposing the connected ends of said plate between a pair of laterally spaced furcations 19 and 20 carried at the front end of an arm 21. These clamping jaws 17 and 18 are provided at their free ends with apertured lugs as 22 through which a clamping screw 23 passes, the tightening of which operates to firmly grip and clamp pencil P between said jaws and the loosening of which permits the pencil to be adjusted or removed.

The arm 21 which carries the marking pencil is revolubly mounted on a sleeve 24, which sleeve has a flange 25 made integral therewith and extends laterally from one end thereof and between which and a collar 26, the eye 27 of arm 21 is mounted and whereby it is held against longitudinal movement, but permitted to rotate on said sleeve 24. The collar 26 has a boss 28 projecting radially therefrom through which a screw threaded bore extends and communicates with the interior of the collar and which is designed to receive a set screw 29 which also enters an aperture 30 in sleeve 24 and engages rod 1 whereby the sleeve 24 and the arm 21 are locked in adjusted position on rod 1.

By so constructing and mounting this pencil P it will be obvious that it may be readily swung from one side to the other of the instrument to adapt it for any use for which it may be desired, and that it may be adjusted longitudinally on rod 1 by loosening set screw 29 and sliding the various parts connected with said arm longitudinally on rod 1 and then again tightening the screw 29 to hold them in their desired positions.

As shown in Fig. 3, the rod 3 has one end thereof extended through one of the bores in block 5 which is mounted on rod 1, said rod 3 extending at right angles to rod 1. As shown, this rod is fixed to block 5 but it need not necessarily be so made and may be adjustably mounted in the block if found desirable. The rod 3 is extended in this figure through the block 5' which block is secured on said rod by one of the set screws 7 hereinbefore mentioned. Rod 4 extends through block 5' at right angles to rod 3 and is adjustably connected therewith by one of the set screws 7 which passes through the end of the block and is designed to engage the rod 4.

An arcuate bar 31 has an aperture 32 extending edgewise therethrough midway the length thereof and which is designed to receive rod 4 which is preferably fixed to said bar 31 by any suitable means. This bar 31 carries at its opposite ends 2 rollers 33, similar in construction to the rollers 15 and 16, and roller 8 hereinbefore mentioned and which are designed to operate as guides and spacers when the implement is in use.

From the above description it will be obvious that the various members of this marking gage, being attachably and detachably engaged with each other, may be removed, assembled and adjusted to suit the purpose for which the marker is to be employed, for instance, as shown in Fig. 1, the parts are connected for use in marking shingles S which are to be trimmed after they have been nailed to the roof R of the building B. When used for this purpose, the rod 1 is disposed longitudinally of the roof or in a direction extending from the top toward the lower edge thereof with the marking implement arranged thereon between the guides arms 11 and the rod 3, the rollers 8 and 15 being designed to travel on the outer faces of the shingles, a marking implement in the form of a pencil P, being so positioned relatively to the edge of the shingles as to mark it along the line on which it is desired to trim them. This marking implement is held in this position by adjusting the rod 4 with the rollers 33 of arm or bar 31 engaging the lower edge of the roof, which edge operates to guide the implement in its movement along the roof and thereby insures the uniform marking of the pencil P so as to position the line to be drawn at a uniform distance from the edge of the roof. From this Fig. 1, it will be obvious that this marking gage, when in operation for the purpose above described, is moved along over the shingle covered roof with the rollers 8, 15 and 33 operating to guide the device while being so moved.

In Fig. 2, the gage is shown for use in marking boards to be sawed, the member b representing the board to be marked, which is shown mounted on a table T. In this use of the gage, the rod 1 is arranged longitudinally of the board to be marked and the pencil P is positioned on said rod between roller 8 and the bar 11 carrying the rollers 15, these rollers 8 and 33 operating to properly space rod 1 from the board to be marked and holding the marking implement in proper position relative to said board. In this application of the device, the rod 3 is so adjusted in block 5 as to properly position rod 4 carrying the bar 31 so as to bring the rollers 33 of said bar into engagement with the front face of the table and these rollers, in connection with the rollers 8 and 15. By arranging these parts and connecting them in adjusted position by the set screw 7, the implement may be moved in a horizontal plane over the board with the pencil point engaging and marking the board at the point desired.

While two application only of this marking gage have been shown, it is to be understood that it may be adapted and used for many other purposes, the parts being arranged to suit the use for which the device is intended.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A marking gage of the class described including a pair of blocks, one having an arm extending laterally therefrom and a bore extending therethrough at right angles to said arm, the other block having bores extending therethrough at right angles to each other, the arm of said first mentioned block being adjustably mounted in one of the bores of the other block, rods adjustably mounted in the remaining bores of said blocks and disposed in parallel planes, a marking element adjustably mounted on one of said rods, and a guide on the other.

2. A marking gage of the class described including a pair of blocks, one having an arm extending laterally therefrom and a bore extending therethrough at right angles to said arm, the other block having bores extending therethrough at right angles to each other, the arm of said first mentioned block being adjustably mounted in one of the bores of the other block, rods adjustably mounted in the remaining bores of said blocks and disposed parallel with each other, a marking element adjustably mounted on one of said rods, guide rollers carried by said rods, and a guide arm having rollers adjustably mounted on the other rod.

3. A marking gage of the class described including a pair of blocks, one having an arm extending laterally therefrom and a bore extending therethrough at right angles to said arm, the other block having bores extending therethrough at right angles to each other, the arm of said first mentioned block being adjustably mounted in one of the bores of the other block, rods adjustably mounted in the remaining bores of said blocks and disposed parallel with each other, a marking element adjustably mounted on one of said rods, guide rollers carried by said rod, a guide arm slidably mounted intermediately its ends on the other rod, and rollers carried by the terminals of said arm.

4. A marking gage of the class described including a pair of blocks, one having an arm extending therefrom and a bore extending therethrough at right angles to said arm, the other block having bores extending therethrough at right angles to each other, the arm of said first mentioned block being adjustably mounted in one of the bores of the other block, rods adjustably mounted in the remaining bores of said blocks and disposed parallel with each other, a marking element adjustably mounted on one of said rods, a roller adjustable longitudinally on said rod, a combined guide arm and spacer having an apertured enlargement midway its ends through which said rod passes, means for securing said arm in adjusted position on said rod, guide rollers carried by the terminals of said arm, and a guide arm carrying rollers mounted on the other rod.

In testimony whereof I affix my signature in presence of two witnesses.

PHILIP E. PETERSON.

Witnesses:
 FRED B. WALKER,
 CHARLES H. RUGGLES.

Copies of this patent may be obtained for five cents each, by addressing the "Commissioner of Patents, Washington, D. C."